Patented July 3, 1951

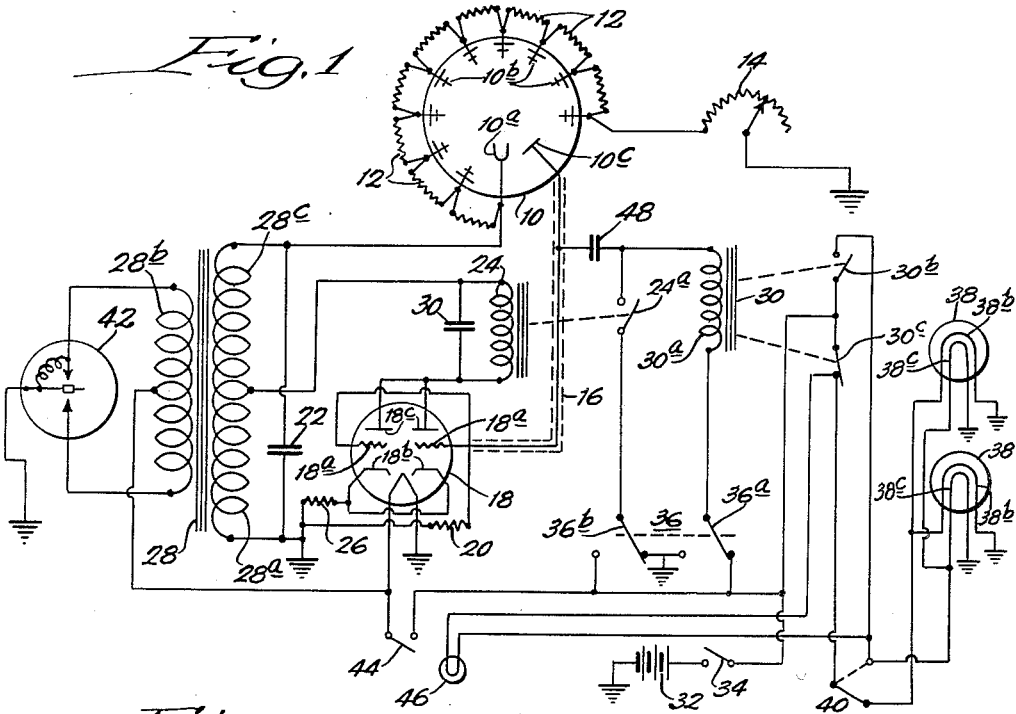
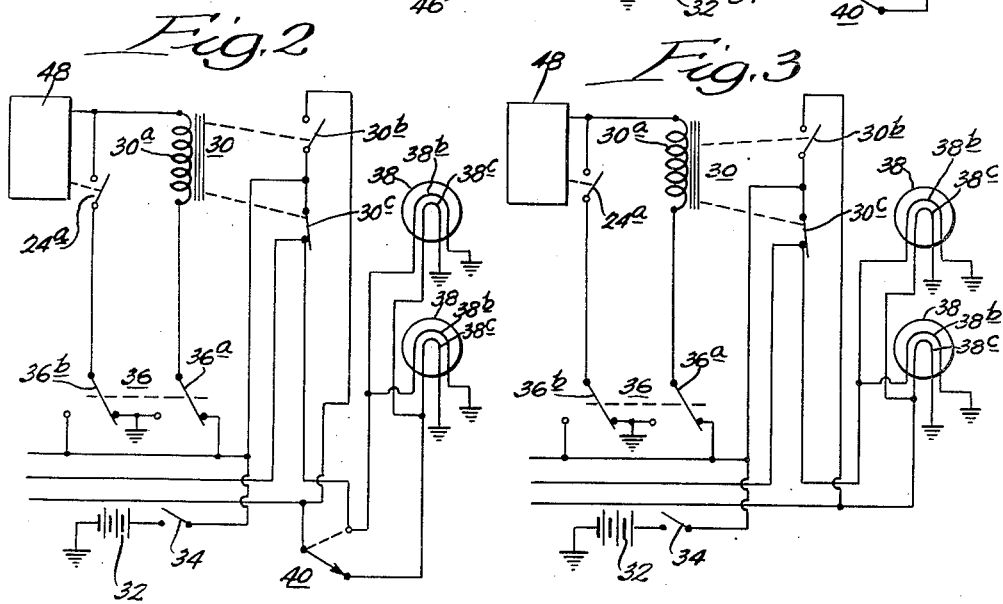

2,558,969

UNITED STATES PATENT OFFICE 2,558,969

AUTOMATIC HEADLIGHT CONTROL

Donald B. Le Croy, Des Moines, Iowa

Application May 6, 1949, Serial No. 91,847

9 Claims. (Cl. 315—83)

My invention relates to an improved mechanism for automatically dimming the headlights of an automobile or the like in response to the lights of an approaching vehicle, and holding them in a dimmed condition for a predetermined time.

This application is a continuation in part of the copending application of myself and William B. Rood, entitled "Electronic Headlight Control," S. N. 4,437, filed January 26, 1948 now abandoned.

One of the problems associated with modern high intensity automobile lights arises from the blinding effect of these lights on the drivers of approaching cars and the consequent danger of accident if the operator of a car overlooks the necessity of dimming his lights.

In accordance with the present invention an improved automatic mechanism operative to dim automobile headlights or the like in response to the approach of an oncoming car is provided. The lights are automatically sealed in the dim condition and held in that condition for a fixed time, such as 3½ seconds, sufficient for oncoming vehicles to pass. The time period also avoids unnecessary cycling of the mechanism when a string of cars is passed.

It is therefore a general object of the present invention to provide an improved automatic headlight dimming mechanism.

Another object of the present invention is to provide an improved headlight dimmer operable to hold the headlights in the dim condition for a predetermined fixed time regardless of the intensity of the oncoming illumination.

Yet another object of the present invention is to provide an improved headlight dimmer having a simple and inexpensive electrical circuit drawing only a small current.

A further object of the present invention is to provide an improved headlight dimmer that positively seals in the dim or bright condition in response to incident illumination.

Still another object of the present invention is to provide an improved headlight dimmer having means manually operable at all times to overrule the automatic mechanism.

The novel features which I believe to be characteristic of my invention are set forth with particularity in the appended claims. My invention itself, however, both as to its organization and method of operation, as well as further objects and advantages thereof, may best be understood by reference to the following description taken in connection with the accompanying drawings in which:

Figure 1 is a circuit diagram of a headlight dimmer constructed in accordance with the present invention; and having manual means operable at all times to turn on the high beam;

Figure 2 is a circuit diagram of an alternative embodiment of the dimmer circuit of Figure 1, having manual means operable at all times to turn on the low beam; and, Figure 3 is a circuit diagram of an alternative embodiment of the dimmer of the circuit of Figure 1, having no manually operable means to overrule the automatic mechanism.

Referring now to Figure 1, there is shown at 10 a photomultiplier tube, such as a type 931A, having an electron-emitting cathode 10a, a plurality of multiplying electrodes or dynodes 10b, and an anode 10c. This tube is mounted in a suitable housing on the left front fender of the automobile or some other suitable location so that the lights of oncoming cars illuminate the cathode 10a and cause electron emission from the same. The electrons so emitted travel to and strike the closest multiplying electrode 10a where they produce many more secondary electrons which in turn travel to the adjacent electrode 10a where the next step in the multiplying process takes place. This process continues until the electron train reaches anode 10c, the total number of electrons at this time being far in excess of that emitted by cathode 10a.

The cathode 10a is maintained at approximately 850 volts negative relative to ground by means described hereafter. This voltage is uniformly distributed among the multiplier electrodes 10b by the resistors 12 which may, for example, be 47,000 ohms each.

The last multiplier electrode 10b is connected to ground through variable resistor 14 which may, for example, be 300,000 ohms. This resistor controls the sensitivity of the circuit to oncoming lights by controlling the voltage step between each pair of adjacent multiplying electrodes 10b.

The anode 10c of tube 10 is connected through shielded wire 16 to the control electrodes 18a of the electron tube 18 which may, for example, be a 6SN7 tube. Resistance 20 defines a current path to ground from control electrodes 18a and may be approximately 10 megohms.

The current path through tube 10 may be traced from filter capacitor 22 to cathode 10a, through tube 10 to anode 10c, through cable 16, and through resistance 20 back to capacitor 22. Since the anode of tube 10c is positive relative to the cathode 10a, increase in this current flow renders the control electrodes 18a more negative and thereby reduces current flow in tube 18.

Tube 18 controls the operation of the relay defined by actuating coil 24 and normally open contacts 24a. The current path through this tube may be traced from the cathodes 18b to the cathode resistance 26, through portion 28a of the secondary winding of transformer 28, through coil 24, to the anodes 18c of tube 18. Since the energizing coil of relay 24 is in this current path, this relay drops out when the negative potential on control electrodes 18a exceeds a predetermined value.

Resistance 26 may be approximately 1600 ohms. A capacitor 30 of approximately 4 microfarads is connected across coil 24 to maintain constant current therethrough and prevent contact chatter due to the intermittent current flow through tube 18.

The relay contacts 24a in turn energize (or de-energize) the low voltage relay 30. This relay is defined by the energizing winding 30a, the normally open contacts 30b and the normally closed contacts 30c. The energizing circuit for relay 30 may be traced from the car battery 32 to main switch 34, pole 36a of polarity reversing switch 36, winding 30a, contacts 24a of relay 24, and through pole 36b of switch 36 back to ground.

The headlight bulbs are indicated at 38, each having a dim or low filament 38b and a bright or high filament 38c.

In the unenergized condition of relay 30, the switch 30c is closed and the dim or low filaments 38b are energized by the circuit which may be traced from battery 32 through switch 34, contacts 30c, switch 40, to filaments 38b and through these filaments to ground.

When relay 30 is energized, the contacts 30b close to define a direct circuit from switch 34 to the high or bright filaments 38c.

Since the contacts 24a are held in the closed condition by current flow through tube 18, and that current flow decreases with illumination on phototube 10, the dim or low filaments 38c are energized when the light on cathode 10a reaches a predetermined intensity.

Space path voltages for tubes 10 and 18 are derived from vibrator 42 which alternately energizes the two halves of primary 28b of transformer 28. The resulting alternating voltage induced in portion 28a of the secondary winding of that transformer is applied directly to tube 18 which acts as a rectifier to draw current only in one direction through energizing coil 24.

The full voltage induced in secondaries 28a and 28c is applied to capacitor 22. The phototube 10 acts as a rectifier in conjunction with this capacitor to charge it to a potential suitable for operation of that tube.

The automatic control is turned on and off by switch 44 which interrupts the circuit from battery 32 to vibrator 42 and the filament of tube 18.

Indicator light 46 is energized when either the dim or the bright beams are on. This operation results from the circuit which can be traced from switch 34, through contacts 30b, to lamp 46 and from that lamp through switch 40 to the unenergized high beam filaments 38b. Since the latter are unenergized, they have no significant voltage drop and the lamp 46 receives practically full battery voltage. When the bright or high beam goes on, the lamp 46 is energized through contacts 30c and the unenergized low or dim filaments 38c.

The contacts 30b and 30c in effect define a single pole double-throw switch operative to energize the filaments respectively. The lamp 46 is connected across the two fixed terminals of this switch.

The manually operated double-throw switch 40 operates to overrule the automatic mechanism and to switch on the high beam filaments 38c. For this operation, it is switched to the position of the dotted lines of Figure 1 and to define a circuit to the high or bright filaments 38c irrespective of the condition of relay 30. This results from the fact that this switch defines a circuit from the contacts 30c to the high filaments 38c and interrupts the circuit to the low filaments 38b.

In accordance with the present invention, the relay 30 is sealed in the open position for a fixed period of about 3½ seconds after each operation. This sealing is effected by capacitor 48 which is connected from winding 30a to the control electrodes 18a of tube 18.

The charging and discharging circuit for capacitor 48 may be traced from ground to resistance 26, to capacitor 48, through switch 24a or winding 30a back to ground, either directly through switch 36 or through battery 32. Capacitor 48 is about 0.05 microfarad to give a time constant of about 0.5 second.

When the space current flow in tube 18 is reduced by light incident on tube 10 to a valve opening relay 24, the switch 24a suddenly opens and the current flow in winding 30a is suddenly cut off. This high rate of current change in winding 30a produces a large positive voltage at the common terminal of that winding and condenser 48 to impart a fixed charge thereto which biases the control electrodes 18a of tube 18 to a fixed negative potential when the current change in winding 30a ceases. The current flow in tube 18 is thereby maintained at a value insufficient to energize relay winding 24 for the fixed period required for capacitor 48 to discharge.

Since the value of the charge on capacitor 48 is determined by the operation of contacts 24a and not by the intensity of illumination on tube 18, the time delay is uninfluenced by the illumination intensity. In other words, once the threshold value is exceeded, the capacitor 48 is fully charged and the predetermined time delay period started.

The purpose of polarity reversing switch 36 is to control the direction of current flow through winding 30a to give the requisite polarity of charge on capacitor 48. If the polarity is wrong, the unit cycles from one condition to the other at a period of approximately 3.5 seconds.

When the charge on capacitor 48 leaks off through resistance 26 to the value at which relay 24 is deenergized and contacts 24a close, a reverse surge occurs through capacitor 48 to raise the potential of control electrodes 18a and positively deenergize relay 24.

A capacitor may be connected across the cathode resistance 26 although this is not necessary for effective operation.

The relay 24 is adapted to close contacts 24a upon current flow of about 3 milliamperes. It opens these contacts when the current is subsequently reduced to about 2.2 milliamperes. The winding 30a has an impedance of approximately 7,000 ohms at 120 cycles per second frequency.

The circuit of Figure 2 is like the circuit of Figure 1 except that operation of manual switch 40 overrules the automatic mechanism to energize the dim or low filaments 38b. It will be observed that when this switch is in the position of the dotted lines the contacts 30b and 30c define parallel paths from filaments 38b to battery 32. The box 49 diagrammatically represents the portions of the automatic control unit not shown in detail in Figure 2.

In the circuit of Figure 3, the switch 40 is eliminated so that no manual overruling of the automatic mechanism is provided.

It will be observed that the mechanism of Figure 1 operates to switch lamps 38 to the dim or low beam when the voltage between cathodes 18b and control electrodes 18a exceeds a predetermined value corresponding to the threshold illumination of phototube 10. These electrodes thus define terminals across which the control voltage is impressed. The capacitor 48 impresses voltage across these terminals by reason of its direct connection to the control electrodes 18a and its connection to the cathodes 18b through winding 30a, ground, and cathode resistance 26. The latter circuit also includes battery 32 in one setting of switch 36. Resistance 20 defines a discharge path for capacitor 48.

The contacts 30b and 30c combine to define a single pole-double throw switch to energize the low and high filaments respectively. In other words, these contacts selectively establish a conducting path from their common connection or terminal to one or the other of the terminals connected to the lamp filaments.

While I have shown and described particular embodiments of my invention it will, of course, be understood that I do not wish to be limited thereto and intend by the appended claims to cover all modifications and alternative constructions as fall within the true spirit and scope of my invention.

What I claim as new and desire to secure by Letters Patent of the United States is:

1. In a dimmer for headlights of the type having an electron tube with cathode and control electrodes, and means including a relay winding operable to dim the headlights when the cathode to control electrode voltage of said tube exceeds a fixed value, the improvement comprising a capacitor connected to impress voltage between said cathode and control electrode, means defining an electric circuit from said winding to said condenser to charge said condenser upon a sudden current change in said winding and means defining a discharge path for said capacitor.

2. In a headlight dimmer, an electron tube having cathode and control electrodes, a relay having a winding operative to dim said headlights in accord with its state of energization, means operative suddenly to change the energization of said relay in accord with the current flow in said tube, a capacitor connected to impress voltage between said control electrode and said cathode, means defining an electric circuit from said winding to said control electrode, and means defining a discharge path for said capacitor.

3. A dimmer for headlights comprising in combination, a relay having a winding and adapted when energized to dim said headlights, a second relay having a pair of contacts adapted to close when voltage across a pair of terminals exceeds a predetermined value, means defining an energizing circuit for said first winding through said contacts, a capacitor, means defining a series circuit through said capacitor and said winding to said pair of terminals and means defining a discharge path across said terminals.

4. A headlight control comprising in combination, an electron tube having cathode and control electrodes, means responsive to incident light to bias said electrodes relative to each other, a relay having an energizing winding and operative to control said headlights when energized, means suddenly to change the state of energization of said winding when said bias exceeds a predetermined value, a capacitor connected to impress voltage across said electrodes, means defining an electric circuit from said winding to said capacitor to charge said capacitor when the state of energization of said winding is changed, and means defining a discharge path for said capacitor.

5. A control circuit adapted to produce fixed time delay regardless of the extent voltage across a pair of terminals exceeds a predetermined threshold value, said circuit including an inductive element, means suddenly to change the current flow through said element when said voltage exceeds said threshold value, a capacitor connected to impress voltage across said terminals and means connecting said capacitor to said element to impress a predetermined charge on said capacitor when said current change occurs.

6. A control circuit adapted to produce a fixed time delay regardless of the extent the voltage across a pair of terminals exceeds a threshold value, said circuit including an inductive element, means responsive to said voltage and operative to cut off predetermined current flow through said element when said voltage exceeds said threshold level, a capacitor connected to impress voltage across said terminals, and means connecting said capacitor to said element to impress predetermined charge on said capacitor when said current flow is cut off.

7. A control circuit adapted to produce a fixed time delay regardless of the extent the voltage across a pair of terminals exceeds a threshold value, said circuit including a relay having a winding, means defining an energizing circuit to said winding, elements adapted suddenly to interrupt said circuit when said voltage exceeds said threshold value, a capacitor connected to impress voltage across said terminals, and means connecting said capacitor to said winding to impress a predetermined charge on said capacitor when said voltage exceeds said threshold value.

8. A control circuit adapted to produce a fixed time delay regardless of the extent voltage across a pair of terminals exceeds a threshold value, said circuit including a relay having a winding, means defining an energizing circuit to said winding, elements adapted suddenly to interrupt said circuit when said voltage exceeds said threshold value, a capacitor and a resistance connected across said relay coil, whereby said capacitor receives a fixed charge when said circuit is interrupted, and means to impress voltage across said terminals in accord with the charge on said capacitor.

9. A control circuit adapted to produce a response for a fixed time period after voltage across a pair of terminals exceeds a predetermined threshold value regardless of the extent the threshold value is exceeded, said circuit including an inductive element, means to produce current flow through said element, means responsive to the voltage across the terminals operative to cut off current flow through the element when the threshold level is exceeded, a capacitor, means defining a circuit to impress voltage from the capacitor across the terminals, means connecting the capacitor to the element to impress a predetermined charge on the capacitor when said current flow is cut off, and means operative in response to the charge.

DONALD B. LE CROY.

REFERENCES CITED

The following references are of record in the file of this patent:

UNITED STATES PATENTS

| Number | Name | Date |
|---|---|---|
| 2,150,900 | Alley | Mar. 21, 1939 |
| 2,219,976 | Berg, Jr. | Oct. 29, 1940 |
| 2,431,394 | Friedman | Nov. 25, 1947 |
| 2,476,389 | Schmidt, Jr. | July 19, 1949 |
| 2,493,307 | Moore et al. | Jan. 3, 1950 |